(12) United States Patent
Ware et al.

(10) Patent No.: US 7,835,130 B2
(45) Date of Patent: Nov. 16, 2010

(54) METHOD AND APPARATUS FOR LIGHTNING PROTECTION OF A COMPOSITE STRUCTURE

(75) Inventors: Michael H. E. Ware, Renton, WA (US); Michael B. Nicholas, Seattle, WA (US); Quynhgiao N. Le, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 389 days.

(21) Appl. No.: 11/867,886

(22) Filed: Oct. 5, 2007

(65) Prior Publication Data

US 2009/0092844 A1 Apr. 9, 2009

(51) Int. Cl.
*H05F 3/00* (2006.01)
*B32B 15/04* (2006.01)
(52) U.S. Cl. ...................... 361/218; 428/457
(58) Field of Classification Search ............. 361/218; 428/457; 427/250, 331, 404, 455, 456
See application file for complete search history.

(56) References Cited

U.S. PATENT DOCUMENTS

| 3,989,984 | A | * | 11/1976 | Amason et al. ............ 361/212 |
| 4,352,142 | A | * | 9/1982 | Olson ....................... 361/218 |
| 6,270,835 | B1 | | 8/2001 | Hunt et al. |
| 7,277,266 | B1 | * | 10/2007 | Le et al. ................... 361/218 |
| 7,352,142 | B2 | * | 4/2008 | Kim et al. .................. 318/135 |
| 2005/0150596 | A1 | * | 7/2005 | Vargo et al. ............... 156/324 |
| 2005/0181203 | A1 | * | 8/2005 | Rawlings et al. ........... 428/337 |
| 2007/0141927 | A1 | * | 6/2007 | Brown ........................ 442/6 |
| 2007/0230085 | A1 | * | 10/2007 | Le .......................... 361/212 |
| 2008/0142238 | A1 | * | 6/2008 | Rawlings ..................... 174/2 |

FOREIGN PATENT DOCUMENTS

EP 0685389 A 12/1995

OTHER PUBLICATIONS

U.S. Appl. No. 11/277,288, filed Mar. 29, 2006, Le.

* cited by examiner

*Primary Examiner*—Jared J Fureman
*Assistant Examiner*—Angela Brooks
(74) *Attorney, Agent, or Firm*—Yee & Associates, P.C.; Dennis R. Plank

(57) ABSTRACT

A method and apparatus for lighting protection. In one advantageous embodiment a method forms a lighting protection system on a composite surface of an aircraft. A dielectric coating is formed on the composite surface in which the dielectric coating covers a metal feature exposed on the composite surface. A metal adhesion promoter is applied in a pattern on the dielectric coating and over additional areas of the composite surface, including a grounding feature to form a metal adhesion promoter layer. A metal coating is formed on the metal adhesion promoter layer to create a path from an area including the metal feature to the grounding feature.

20 Claims, 4 Drawing Sheets

METHOD AND APPARATUS FOR LIGHTNING PROTECTION OF A COMPOSITE STRUCTURE

BACKGROUND INFORMATION

1. Field

The present disclosure relates generally to aircraft and in particular to reducing electromagnetic effects on components in an aircraft. Still more particularly, the present disclosure relates to a method and apparatus for reducing electromagnetic effects from lightning strikes to aircraft structures containing composite materials and metal components.

2. Background

Aircraft are being designed and manufactured with greater and greater percentages of composite materials. Some aircraft may have more than fifty percent of its primary structure made from composite materials. Composite materials are used in aircraft to decrease the weight of the aircraft. This decreased weight improves performance features, such as payload capacities and fuel efficiencies. Further, composite materials provide longer service life for various components in an aircraft.

Composite materials are tough, light-weight materials, created by combining two or more dissimilar components. For example, a composite may include fibers and resins. The fibers and resins are combined and cured to form a composite material.

Further, by using composite materials, portions of an aircraft may be created in larger pieces or sections. For example, a fuselage in an aircraft may be created in cylindrical sections that may be put together to form the fuselage of the aircraft. Other examples include, without limitation, wing sections joined to form a wing or stabilizer sections joined to form a stabilizer.

In particular, carbon fiber reinforced plastic (CFRP) materials are examples of composite materials that are increasingly used for structural components in commercial aircraft in place of traditional aluminum structures. These types of composite materials are used because these materials provide a higher strength-to-weight ratio than aluminum.

Lightning strikes occur regularly on aircraft traveling near or through a thunderstorm. A lightning strike on an aluminum aircraft typically does not result in damage that affects the flight safety of the aircraft due to the material's highly effective ability to conduct and disperse the lightning current away from the point of attachment, but may leave a burn mark. Additionally, pits or burns on the aircraft may occur at the point of entry and/or exit for the lightning strike. In particular, a lightning strike arcing may occur between a fastener and a hole in the structure, in which fasteners are used to hold different structural components of the aircraft together. This type of arcing may induce a defect on the surface, which is also referred to as "pitting".

Carbon fiber, however, is approximately two thousand times more resistive than aluminum and exists in a dielectric polymeric matrix. As a result, the amount of damage and possible sparking, at the skin of an aircraft where fasteners are, to the exposed surface may be higher than aluminum skins.

Damage to an unprotected carbon fiber reinforced plastic materials on an aircraft is often more severe than as compared to an aluminum structure. The temperatures caused by a lightning strike may heat up in carbon fibers, which have a lower thermal conductivity than metal. If the fiber temperatures in these materials exceed the pyrolyzation temperature of a surrounding matrix, the resin will transform from a solid to a heated gas. This pressurized gas may lead to delamination, punctures to the composite skin structures, and possibly the ejection of hot particles or sparks from the fastener interfaces and carbon fiber reinforced plastic joints.

These types of situations are currently prevented through various mechanisms for reducing both lightning damage and the possibility of fuel ignition as required for airworthiness and economic structure repairs. Lightning damage may result in the puncture or delamination of plies within the composite material.

Lightning protection systems are used to prevent the effects of a lightning strike without affecting the safety of flight. These types of systems assure that no sparking occurs at structural joints, on fuel couplings, and on hydraulic couplings within the fuel tank, as the lightning travels from an entry point to an exit point on the aircraft.

A number of technologies are currently available to provide protection for these types of composite materials on aircraft. Certain technologies are offered for diversion of lightning current from the attachment point to reduce the current density. Among them, one type of system involves the use of a copper grid co-cured into the composite skin layup, while another involves the use of conductive appliqué or decals applied over fasteners.

The copper grid lightning protection system integrates copper foil into the composite laminate at fastening areas. The copper foil, in this type of technique, is added to the part lay-up of composite skin prior to curing. The copper foil contacts selected fasteners to permit current distribution between the fasteners and reduce the current that may enter the fasteners.

Similarly, the conductive appliqué or decal is designed to divert lightning away from skin fasteners, preventing internal arcing and sparking to minimize damage to carbon fiber reinforced plastic skins and substructures. This type of system applies strips of dielectric layers and conductive layers to the cured composite skin using a pressure sensitive adhesive after fastener installation. In this type of system, the strips for the dielectric layer have an adhesive backing, which is placed onto the surface of the skin. Then, different strips of conductive layers may be placed over the dielectric layer and other areas of the skin. These strips of conductive layers also have an adhesive backing on the back of the strips.

SUMMARY

The different advantageous embodiments provide a method and apparatus for lighting protection. In one advantageous embodiment, a method forms a lighting protection system on the surface of composite structures such as an aircraft. A dielectric coating is formed on the composite surface in which the dielectric coating covers a metal feature exposed on the composite surface. A metal adhesion promoter is applied in a pattern on the dielectric coating and over additional areas of the composite surface to form a metal adhesion promoter layer. A metal coating is formed on the metal adhesion promoter layer and over a grounding feature to create a path from an area including the metal feature to the grounding feature.

In another advantageous embodiment, a method is used to form a lighting protection structure. A dielectric layer is formed on a surface of a composite component over a protected metal feature. A continuous conductive layer having a pattern covering a portion of the dielectric layer over the protected metal feature and covering a grounding feature is formed.

In yet another advantageous embodiment, the lightning protection system comprises a dielectric coating and a conductive coating. The dielectric coating is applied to a portion of a surface of a composite component and covering a metal feature exposed in the surface. The conductive coating is electrically connected to a grounding feature and covering the dielectric coating in an area encompassing the metal feature covered by the dielectric coating.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
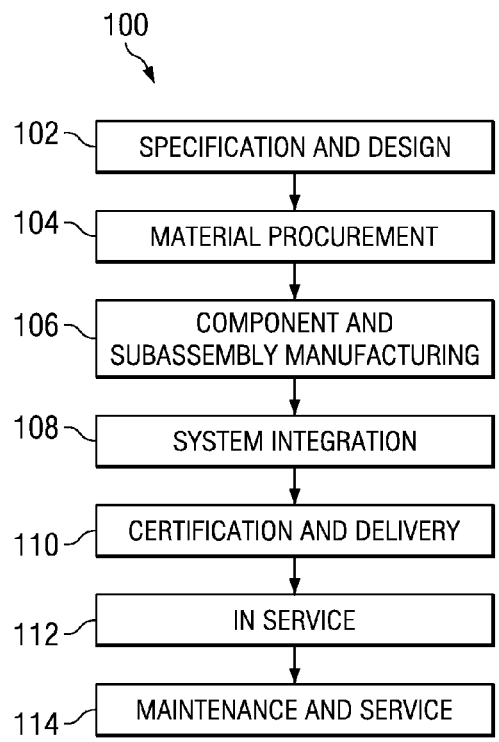
FIG. 1 is a diagram illustrating an aircraft manufacturing and service sequence in which an advantageous embodiment may be implemented.
Figure 2:
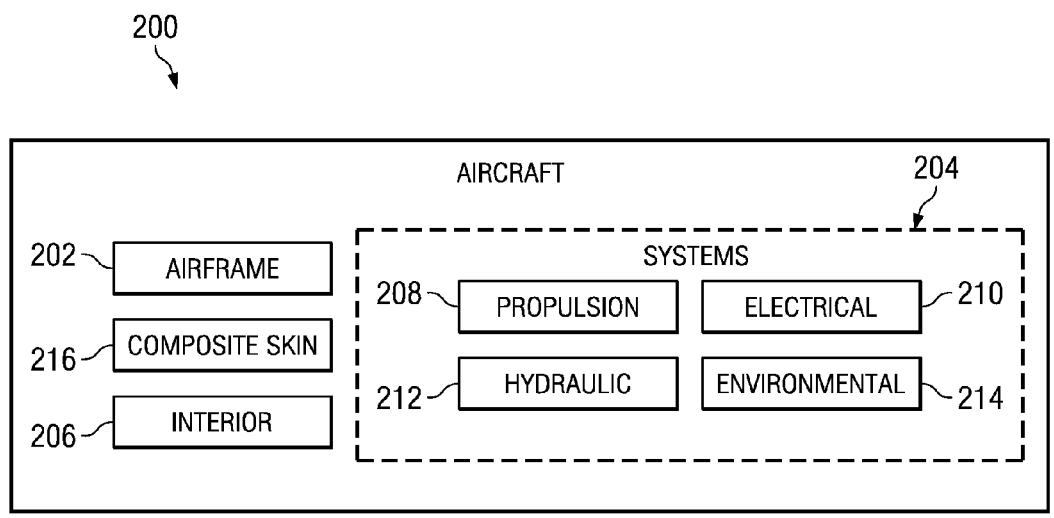
FIG. 2 is a diagram of an aircraft in accordance with an advantageous embodiment.

Referring more particularly to the drawings, embodiments of the disclosure may be described in the context of aircraft manufacturing and service sequence 100 as shown in FIG. 1 and aircraft 200 as shown in FIG. 2. Turning first to FIG. 1, a diagram illustrating an aircraft manufacturing and service sequence is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. In these examples, aircraft 200 also includes an exterior in the form of composite skin 216, which is attached to airframe 202. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 in FIG. 1 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 in FIG. 1 or during maintenance and service 114 in FIG. 1.

As a specific example, the different advantageous embodiments may be implemented during component subassembly and manufacturing 106 in FIG. 1 and/or system integration 108 in FIG. 1 to install a lightning protection system for aircraft 200 on composite skin 216. The different advantageous embodiments also may be employed to repair or replace the lightning protection system on composite skin 216 during maintenance and service 114 in FIG. 1 as another example.

The different advantageous embodiments recognize that the currently available lightning protection systems have a number of drawbacks with respect to practical use. The copper grid system is implemented during the manufacturing of a composite skin, such as composite skin 216, for aircraft 200. Further, manufacturing and rework issues are present with this type of technology. Some of the issues may include, for example, wrinkling of the copper foil during the lay-up and cure process, copper contamination in the fuel tank from subsequent drilling operations for fastener installation, and lack of practical rework methods to fully restore performance from a defective condition that may occur during manufacturing or after a lightning strike.

The advantageous embodiments also recognize that the appliqué or decal strip approach has drawbacks, with respect to the weight needed to integrate the conducted surface protection layer in composite skin 216 for the wing. The different advantageous embodiments recognize that this type of lightning protection system comes in preformed strips, which are applied or placed onto composite skin 216 to provide conductive paths for diverting lightning current. The different advantageous embodiments also recognize that to implement this type of system, the thickness of the layers are often thicker than needed for the required lightning protection functionality, thus resulting in un-necessary weight penalties to the system. An edge sealant is likely used, in this type of system, to prevent paint cracking due to the sharp transition of the appliqué edges. Further, the appliqué or decal system also may result in the need for periodic replacement, resulting from environment effects and repainting requirements.

The different advantageous embodiments recognize that the currently available techniques for creating lightning protection systems or structures on composite surfaces of an aircraft, such as composite skin 216, are difficult to implement and/or are difficult to maintain. Further, the different advantageous embodiments also recognize that some of the currently used systems for lightning protection do not easily facilitate reducing weight in an aircraft. Also, the different advantageous embodiments recognize that these different techniques also may require reapplication during the life and maintenance of the aircraft.

The different advantageous embodiments provide a method and apparatus for forming or installing a lightning protection system on an aircraft. In particular, the different advantageous embodiments provide a patterned multi-layer, seamless coating for a composite structure lightning protection system. A lightning protection system may be installed or formed on the surface of a composite component, such as composite skin 216, by forming a dielectric layer on the surface of the composite component over a metal feature. A continuous conductive layer having a pattern covering a portion of the dielectric layer over the metal surface and covering a grounding feature also is formed.

Figure 3:
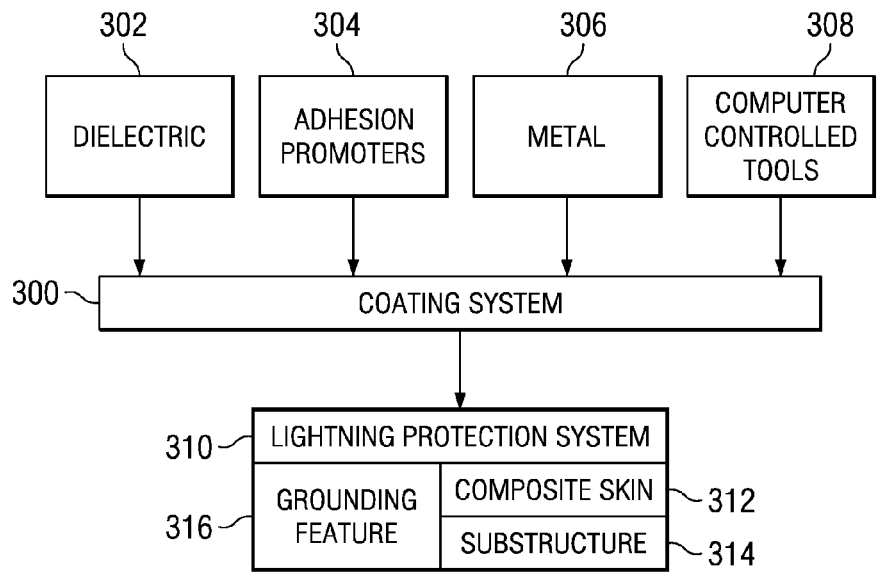
FIG. 3 is a block diagram illustrating components used to form a lightning protection system in accordance with an advantageous embodiment.

Turning now to FIG. 3, a block diagram illustrating components used to form a lightning protection system is depicted in accordance with an advantageous embodiment. In this example, coating system 300 uses dielectric 302, adhesion promoter 304 and metal 306 to form lightning protection system 310. Lightning Protection system 310 may be formed after fasteners are applied or installed. Lightning protection system 310 protects composite skin 312 and substructure 314 from damages resulting from lightning strikes that may affect flight safety. Lightning protection system 310 directs currents from an electromagnetic effect, such as a lightning strike, to grounding feature 316.

In these examples, coating system 300 may include one or more machines or tools that are used to form layers for coatings, on composite skin 312, to create lightning protection system 310. In the different examples, coating system 300 may contain computer controlled tools 308. These tools may be programmed to form coatings in a precise pattern on composite skin 312.

The manner in which the different coatings may be formed may vary, depending on the particular embodiment or example. The different types of processes or techniques used to form the layers for lightning protection system 310, however, exclude the use of manually placing preformed metal and dielectric layers, with adhesive on the back side of these layers, on to the aircraft, as currently employed in some techniques. For example, the adhesion promoter layers may be sprayed or deposited using standard liquid paint processes. However, any process used to form a polymer or silane layer or coating on a surface may be employed, in the different advantageous embodiments.

Further, coating system 300 does not require forming lightning protection system 310 as part of the process of creating composite skin 312. This type of feature provides an advantage over current systems that integrate the lightning protection system with composite skin 312 by avoiding various manufacturing issues and maintenance issues that may occur, such as rework of manufacturing defects or structural repair of in-service damage.

Further, coating system 300 allows for the creation of layers or coatings that may vary in thickness at different locations. As a result, the different layers may be tapered to avoid abrupt edges that may result in cracked paint on a finished aircraft. As a result, additional processing, such as edge sealants to the edge of lightning protection system 310, is unnecessary.

Coating system 300 may be a polymeric coating with sufficient properties to serve as a dielectric layer over composite skin 312 to isolate lightning current that may be present in the conductive layer from metallic surface features. These properties of the dielectric may be, for example, a selected amount of insulation. The amount of insulation needed may vary, depending of the amount of current for which insulation is desired. Depending on its chemistry and the complexity of the application surface, the dielectric coating may be applied, for example, without limitation, by manual or automatic spraying; curtain coating; or brush coating.

For example, the dielectric layer may be sprayed or deposited using chemical deposition, thermal spray as well and standard liquid paint processes. Of course, these examples are only illustrating some of the techniques that may be used to form a polymer coating. Any process used to form a polymer layer or coating on a surface may be employed in the different advantageous embodiments.

Coating system 300 uses an adhesion promoter from adhesion promoters 304 to form an adhesion promoter layer in a pattern over areas on which a conductive layer is to be formed. Coating system 300 then uses metal 306 to form the conductive layer in the pattern over the areas on which the adhesion promoter layer is formed. The conductive layer provides a pattern that directs current from a lightning strike to specific grounding feature 316 strategically located away from flight critical areas.

Coating system 300 may apply metal 306 using a number of different mechanisms to form a metal, conductive layer in lightning protection system 310. For example, without limitation, the metal layer may be sprayed or deposited using state of the art thermal spray such processes such as twin-arc wire spray. Of course, any different metallization process may be used, such as, for example, chemical deposition, plasma processes, and high velocity oxygen fuel processes. These examples are only some of the techniques that may be used to form a metal coating. Any process used to form a metal layer or coating on a surface may be employed in the different advantageous embodiments.

Figure 4:
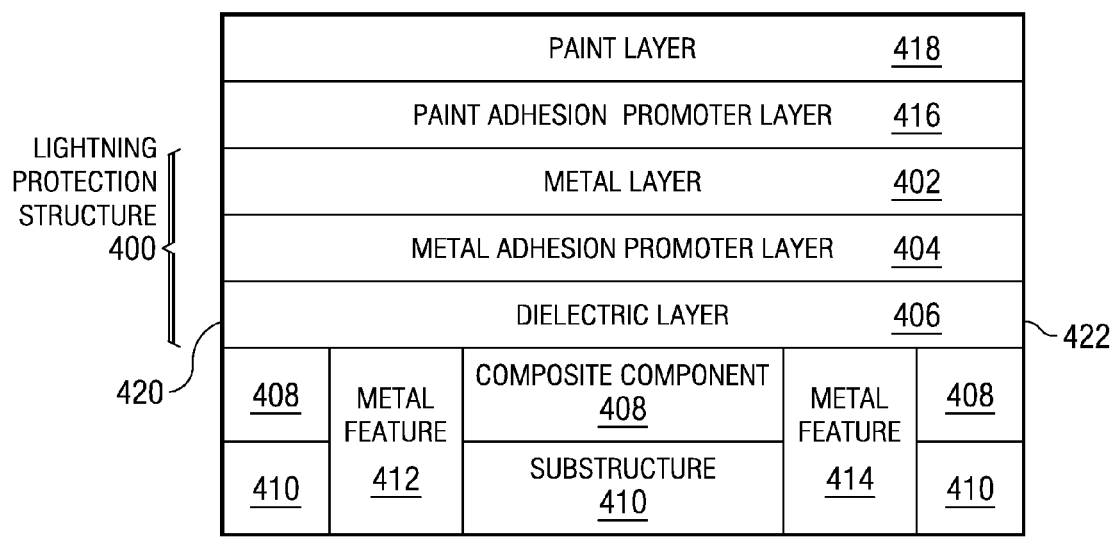
FIG. 4 is a block diagram illustrating cross-sections of a portion of a lightning protection system over metal features in accordance with an advantageous embodiment.

Turning now to FIG. 4, a block diagram illustrating cross-sections of a portion of a lightning protection system over metal features is depicted in accordance with an advantageous embodiment. In this example, lightning protection structure 400 contains metal layer 402, metal adhesion promoter layer 404, and dielectric layer 406. These layers are also referred to as "coatings". In the different advantageous embodiments, all of the layers in lightning protection structure 400 are formed on the surface of the composite component. In other words, a layer is not formed ahead of time in a sheet or strip and then bonded or adhered to a surface using an adhesive or glue. The different advantageous embodiments do not use preformed, cured strips or sheets. Instead, the different layers are formed directly on other layers or on the surface. This type of process is in contrast to typical lightning protection mechanism in which preformed layers of materials are placed or attached to the surface of the aircraft for surface protection purposes. The use of pre-formed materials for in the lightning protection design also necessitates the presence of seams and splices that can disrupt the flow of lightning current from the point of attachment to the intended grounding features. The advantageous embodiments provide improved performance in which the disruption of lightning current flow is eliminated or minimized.

In this example, lightning protection structure 400 is located on a composite component, such as composite component 408, which is located over substructure 410. In this example, composite component 408 is a composite skin. Substructure 410 may be, for example, a spar, a rib or other frame structures, in this example. Of course, substructure 410 may be any substructure under composite component 408, in these examples.

Lightning protection structure 400 is formed on composite component 408 in a manner that this structure covers metal features 412 and 414. Lighting protection system 400 protects metal features 412 and 414 from a lightning strike. In these examples, metal features 412 and 414 may be, for example, metal fasteners used to fasten composite component 408 to substructure 410. In particular, dielectric layer 406 acts as an insulator to protect metal features 412 and 414 from currents caused by a lightning strike or other electromagnetic effect. Metal layer 402 conducts the current and is patterned to conduct the current away from metal features 412 and 414 to a ground feature. Metal adhesion promoter layer 404 is employed to promote the adhesion or bonding of metal layer 402 to dielectric layer 406 when metal layer 402 is formed. In some embodiments, metal adhesion promoter layer 404 may be unnecessary if dielectric layer 406 employs materials that allow for the metal in metal layer 402 to adhere or bond to dielectric layer 406.

Additionally, paint adhesion promoter layer 416 may be applied onto metal layer 402. Thereafter, paint layer 418 may be applied to finish out the surface of the aircraft. Paint layer 418 may include a primer and a topcoat. Paint layer 418 is a specific example of a protective coating for lighting structure 400. This protective coating is selected to protect lighting structure 400 from the environment. Of course, other types of protective coatings may be used, in other advantageous embodiments.

Metal layer 402 and dielectric layer 406 may be formed or created with a minimal thickness that is sufficient to provide protection from lightning strikes, but reduces weight as compared to preformed strips that are applied to the surface of the aircraft.

In these examples, dielectric layer 406 may have a thickness of approximately 0.005 inches. The thickness, in the different illustrative examples, may vary from around 0.001 inches to around 0.010 inches, depending on the particular implementation location. For example, dielectric layer 406 may be thinner at edges 420 and 422 of lightning protection structure 400. The thinning of the layer may provide a tapering that may prevent cracking of paint layer 418. In this example, metal adhesion promoter layer 404 may have a thickness of around 0.0015 inches. This layer may vary in thickness, depending on the type of adhesion promoter and type of metal being used. The thickness of metal adhesion promoter layer 404 may range from around 0.0003 to around 0.003 inches.

Metal layer 402 may have various thicknesses, depending on the type of metal used. The thickness of metal layer 402 may vary from around 0.0005 to around 0.005 inches. Metal layer 402 may be implemented using different types of materials. For example, aluminum, copper, stainless steel, titanium, and invar may be used. Invar is a specially formulated nickel-iron alloy with a low coefficient of expansion. The actual thickness employed may depend on how much current is designed to be carried by the conductive layer.

Dielectric layer 406 may be formed using different materials. Some examples include, for example, epoxy primer filled with glass and other components. Other examples of a dielectric that may be used include polyurethane, acrylics, ceramic polymers, or even a composite material. In most cases, a dielectric having a homogeneous composition is employed.

Metal adhesion promoter layer 404 may be formed using various materials, such as an epoxy or polyurethane. These components may include, for example, glass microspheres and metal oxides. An example product is Epocast 89537AB, which is available from Huntsman International, LLC. Dielectric layer 406 is designed to have a high dielectric value when dielectric layer 406 is formed.

Figure 5:
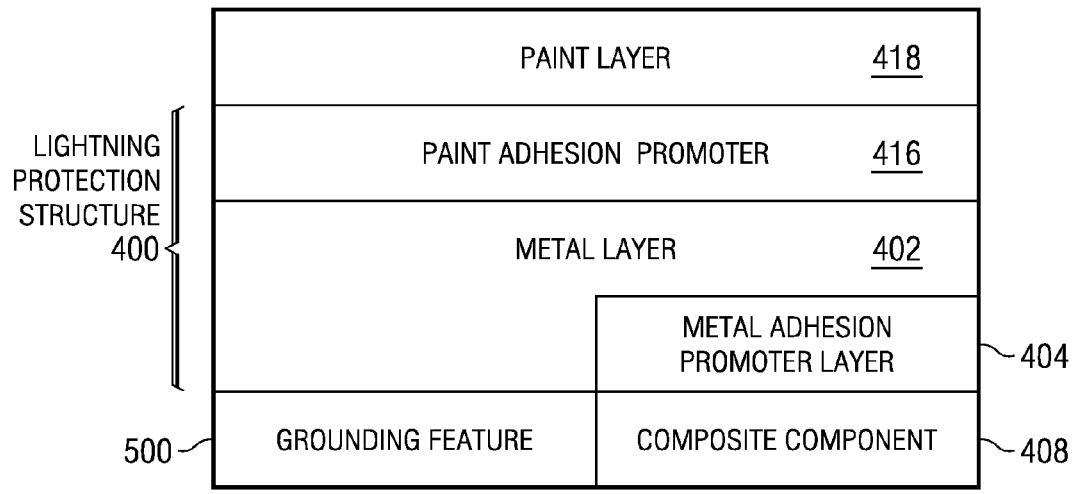
FIG. 5 is a block diagram illustrating cross-sections of another portion of a lightning protection system over a grounding feature in accordance with an advantageous embodiment.

Turning now to FIG. 5, a block diagram illustrating cross-sections of another portion of a lightning protection system over a grounding feature is depicted in accordance with an advantageous embodiment. In this example, another portion of lightning protection system 400 is illustrated. In this depicted view, metal layer 402 leads from the view illustrated in FIG. 4 to this view to provide a path from metal features 412 and 414 in FIG. 4 to grounding feature 500. In this example, the portion of lightning protection structure 400 shown is located over grounding feature 500. Lightning protection structure 400, in this illustrated cross-section, does not include dielectric layer 406 as shown in FIG. 4.

Dielectric layer 406 is present over or around areas containing metal features, in these examples. Metal layer 402 extends over grounding feature 500 to provide a path to the grounding feature. Dielectric layer 406 is unnecessary in this portion because metal features are not present in which current may flow. Instead, any metal features that may be present are part of grounding feature 500, in these examples.

Figure 6:
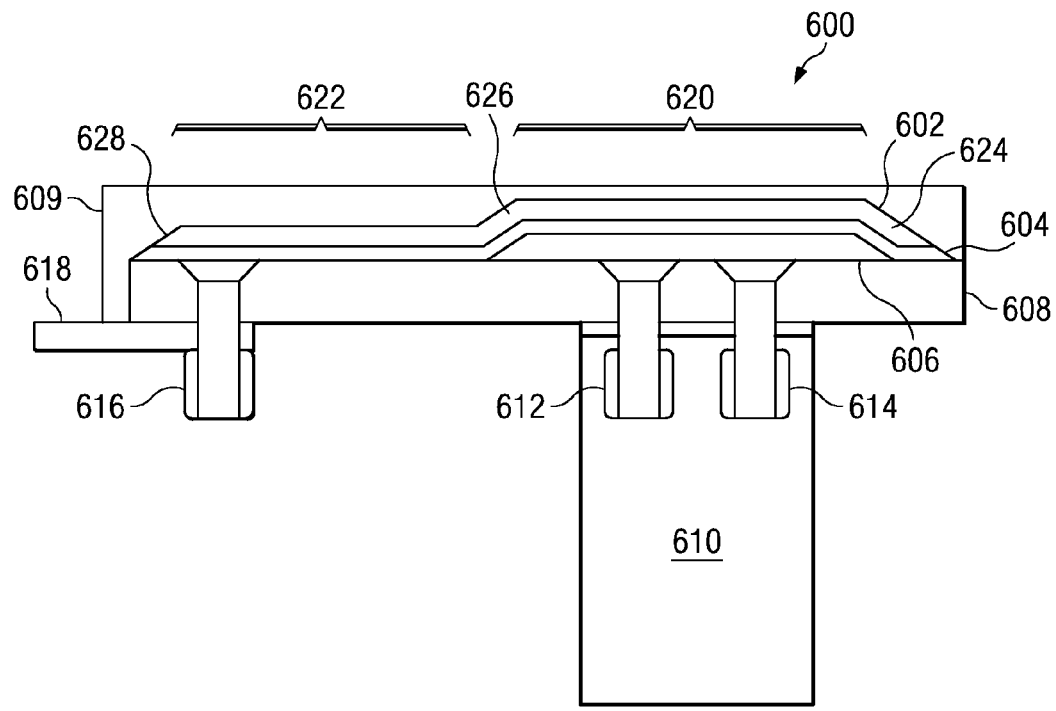
FIG. 6 is a cross-sectional view of a lightning protection system in accordance with an advantageous embodiment.

With reference now to FIG. 6, a cross-sectional view of a lightning protection system is depicted in accordance with an advantageous embodiment. In this example, lightning protection system 600 includes metal layer 602, metal adhesion promoter layer 604, and dielectric layer 606. Lightning protection system 600 is formed on composite skin 608 and composite skin 608 is attached to shear tie 610.

Protective coating 609 is formed over all of the structures. Protective coating 609 is paint, in these examples, and may include a primer and a topcoat. Shear tie 610 is an example of a substructure that may fabricated from metal alloys or less conductive material systems, such as carbon fiber reinforced plastic in substructure 410 in FIG. 4. Composite skin 608 is connected to shear tie 610 using fasteners 612 and 614, which are examples of metal features, such as metal features 412 and 414 in FIG. 4.

In this example, fastener 616 and ground strip 618 form a grounding feature, such as grounding feature 500 in FIG. 5. Section 620 is similar to the cross-sections illustrated in FIG. 4, while section 622 is similar to the cross-sections illustrated in FIG. 5. As can be seen, the thickness of the different layers may vary in different portions of lightning protection system 600. As can be seen, dielectric layer 606 is tapered at section 624 and section 626. In a similar manner, metal layer 602 and metal adhesion promoter layer 604 also is tapered at section 624 and at section 628.

Figure 7:
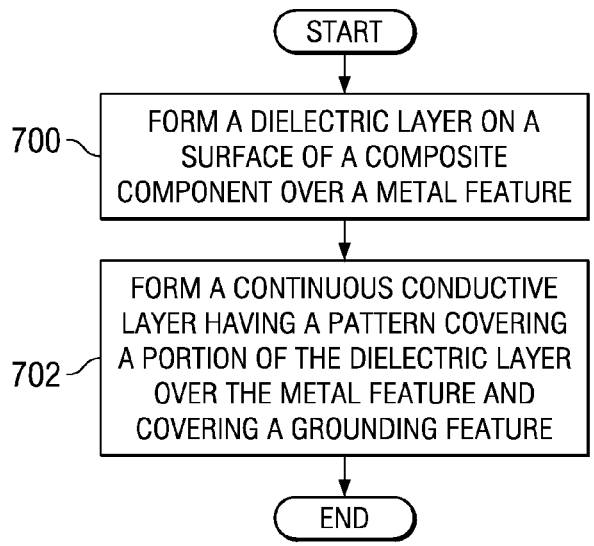
FIG. 7 is a high level flowchart of a process for forming a lightning protection system in accordance with an advantageous embodiment.

Further, the lightning protection system described in FIG. 7, and in the other figures above, may be employed even in areas without metal features. This type of system may be used to minimize the effect of lightning strikes and reducing or eliminating localized damage from the lightning strikes. This type of feature is especially useful to protect areas of the aircraft in which components, such as a fuel tank or other equipment, are located below the skin of the aircraft. These types of components may be part of the substructure of the aircraft. Further, the different advantageous embodiments may serve to protect the composite structure in areas in which metal features, such as fasteners, are present.

Turning now to FIG. 7, a high level flowchart of a process for forming a lightning protection system is depicted in accordance with an advantageous embodiment. The process begins by forming a dielectric layer on the surface of a composite component over a metal feature (operation 700). In this example, the composite component may be the skin of an aircraft. The metal feature may take the form of a fastener used to fasten the skin to the aircraft. More specifically, the fastener may fasten the skin of the aircraft to a shear tie or a spar, which is in turn connected to other structural framework of the aircraft.

Then, a continuous conductive layer having a pattern covering the portion of the dielectric layer over the metal feature and covering a grounding feature is formed (operation 702), with the process terminating thereafter. The continuous conductive layer is continuous, in these examples, from the area over the metal feature to the grounding feature. In this manner, a path is formed through which current will flow if an electromagnetic effect, such as a lightning strike, occurs on or near the location of the metal feature.

Figure 8:
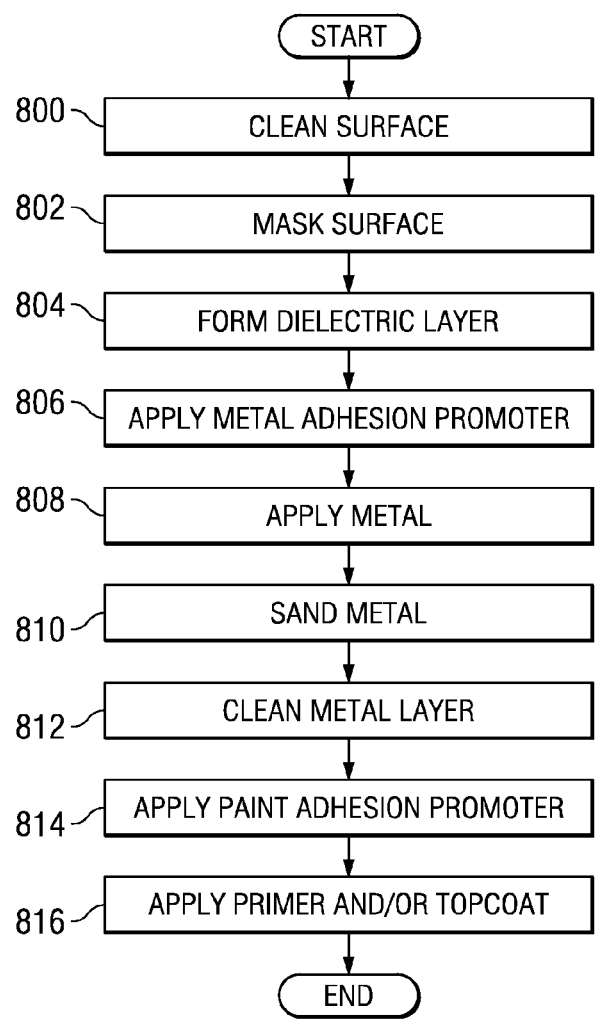
FIG. 8 is a detailed flowchart of a process for forming a lightning protection system on an aircraft in accordance with an advantageous embodiment.

Turning now to FIG. 8, a detailed flowchart of a process for forming a lightning protection system on an aircraft is depicted in accordance with an advantageous embodiment. This flowchart describes a process for creating a multi-layered patterned coating for a composite lightning system.

The process begins by cleaning the surface of the composite component (operation 800). The composite component may be any component, such as the skin of an aircraft. Of course, this process may be applied to any composite component for which lightning protection is desired. The surface may be cleaned using a solvent or alkaline cleaning solution, in these examples. The cleaning of the surface is performed to provide an appropriate surface for the different layers of the lightning protection system that are formed on the surface.

Thereafter, the process optionally masks the surface (operation 802). The masking is optional because in some cases, the computer control processes may precisely deposit the different layers in the desired pattern without requiring a mask. The process then forms a dielectric layer (operation 804). The dielectric layer may be formed using various processes as described above. Any process used to form a layer on a surface of a composite component may be employed. Next, a metal adhesion promoter is applied to create a metal adhesion promoter layer (operation 806). In these examples, a metal adhesion promoter layer is formed to promote the formation of the metal layer. In other words, this layer is used to help or aid in ensuring that the metal adheres to the underlying material. Of course, this layer may be unnecessary if the process and/or dielectric material being used will allow for metal to adhere or be formed on the dielectric directly. Thereafter, a metal is applied to form a metal layer (operation 808). As with the dielectric layer, the metal layer, in operation 808, may be formed using various techniques for creating metal layers on the surface of another layer, such as on the surface of the metal adhesion promoter layer.

The metal layer may then be sanded (operation 810). This operation is an optional one, depending on the particular requirements, as well as the type of metal and the manner in which the metal is formed on the surface. Next, the process cleans the metal layer (operation 812). The cleaning is performed to prepare the metal layer for applying a promoter for later painting of the composite component.

The process applies a paint adhesion promoter (operation 814). In these examples, this paint adhesion promoter may be, for example, sol-gel, which is a commercially available product. Sol-gel may be a coating consisting of an inorganic network of reactive metal ligands, such as AC-131 from AC Products Inc. In other examples, the paint adhesion promoter may be applied using other inorganic network-forming formulations on the coatings that are exposed. The process applies the primer and/or topcoat (operation 816), with the process terminating thereafter. These different materials form the protective coatings. In operation 816, the primer and topcoat provides a paint scheme to protect the surface of the aircraft from various environmental effects.

Further, the process illustrated in FIG. 8 may be applied to a new component as well as to perform a repair. When performing a repair, the different operations are used to repair an area in which damage has occurred due to an event, such as lightning strike or environmental wear and tear on the surface of the component. The different processes of the advantageous embodiments may be performed by computer controlled tools, in these examples. Also, in some cases, some of the operations may be performed by hand. For example, in forming the different layers, operation 802 is employed if an operator controls the tools used to apply or form the different layers on the aircraft. The different materials may be painted on to form the layers in other illustrative embodiments.

Thus, the different advantageous embodiments provide a method and apparatus for forming a lightning protection system. A dielectric layer is formed on, surface of, composite component over a metal feature. The continuous conductive layer having a pattern covering a portion of the dielectric layer over the metal feature and covering a grounded feature is formed.

In these examples, the formation of these layers may be made with much more precision and with a smaller thickness as compared to the current system in which strips of dielectric and conductive layers are placed onto the surface of the aircraft.

Further, the different advantageous embodiments may be applied to both new installations and repairs of lightning strike protection systems. The different advantageous embodiments do not require any cutting or performing strips or sheets for placement on to an aircraft. Further, with the different advantageous embodiments, a continuous layer of dielectric and a continuous layer of connectors may be formed without gaps, as opposed to the placement of strips.

The description of the different advantageous embodiments has been presented for purposes of illustration and description, and is not intended to be exhaustive or limited to the embodiments in the form disclosed. Many modifications and variations will be apparent to those of ordinary skill in the art. Although the depicted embodiments are directed towards a lighting protection system for aircraft, different advantageous embodiments may be applied to other structures. For example, the different advantageous embodiments may be used on buildings, carts, trucks, and ships.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for forming a lighting protection system on a surface of a composite component of an aircraft, the method comprising:

forming a dielectric coating on an area of the surface of the composite component, the dielectric coating being created on the area of the surface of the composite component during the forming of the dielectric coating, the dielectric coating covering a metal feature exposed on the surface of the composite component;

applying a metal adhesion promoter in a pattern on the formed dielectric coating and on an additional area of the surface of the composite component, including on a grounding feature to form a metal adhesion promoter layer; and forming a metal coating on the applied metal adhesion promoter layer, the metal coating being created on the metal adhesion promoter layer during the forming of the metal coating to provide a path from the area including the metal feature to the grounding feature, the metal adhesion promoter layer promoting bonding of the metal coating to the dielectric coating when the metal coating is created on the metal adhesion promoter layer.

2. The method of claim 1 further comprising:

applying a paint adhesion promoter to the formed metal coating to form a paint adhesion promoter layer; and forming a paint coating on the paint adhesion promoter layer, the paint coating being created on the paint adhesion promoter layer during the forming of the paint coating, the paint adhesion promoter layer promoting bonding of the paint coating to the metal coating when the paint coating is created on the paint adhesion promoter layer.

3. The method of claim 2 further comprising:

cleaning a surface of the formed metal coating prior to applying the paint adhesion promoter.

4. The method of claim 1, wherein the surface of the composite component is on a wing of the aircraft.

5. The method of claim 1, wherein forming the metal coating comprises forming the metal coating using a direct metallization process.

6. The method of claim 1, wherein the metal adhesion promoter layer comprises an epoxy resin filled with glass and metal oxides.

7. The method of claim 1, wherein forming the dielectric coating on the area of the surface of the composite component, comprises one of spraying, curtain coating or brush coating.

8. The method of claim 1, wherein forming a metal coating on the metal adhesion promoter layer, comprises one of spraying, chemical deposition, plasma processes or high velocity oxygen fuel processes.

9. The method of claim 1, wherein the forming steps are performed by a computer controlled tool.

10. A method for forming a lighting protection system comprising:

forming a continuous dielectric layer on a surface of a composite component and over a protected metal feature, the continuous dielectric layer being created on the surface of the composite component and over the protected metal feature during the forming of the continuous dielectric layer;

applying a metal adhesion promoter in a pattern on the formed continuous dielectric layer and on an additional area of the surface of the composite component, including on a grounding feature, to form a metal adhesion promoter layer; and forming a continuous conductive layer having a pattern that covers the dielectric layer over the protected metal feature and that covers the grounding feature, the continuous conductive layer being created on the applied metal adhesion promoter layer during the forming of the continuous conductive layer, the metal adhesion promoter layer promoting bonding of the continuous conductive layer to the continuous dielectric layer when the continuous conductive layer is created on the metal adhesion promoter layer.

11. The method of claim 10, wherein the composite component is a skin of an aircraft and the protected metal feature is a metal fastener connecting the skin to an airframe of the aircraft.

12. The method of claim 10, wherein forming the continuous conductive layer comprises forming the continuous conductive layer using a process selected from one of chemical deposition, kinetic spray processes, plasma processes, and high velocity oxygen fuel processes.

13. The method of claim 10, wherein the metal adhesion promoter layer comprises an epoxy resin filled with glass and metal oxides.

14. The method of claim 10, wherein forming the continuous dielectric layer comprises creating the continuous dielectric layer by one of spraying, curtain coating or brush coating.

15. The method of claim 10, wherein the continuous conductive layer is formed using a material selected from one of aluminum, copper, stainless steel, titanium, and invar.

16. The method of claim 10, wherein forming the continuous dielectric layer and forming the continuous conductive layer are performed to repair an existing lighting protection system.

17. The method of claim 10, wherein the forming steps are performed by a computer controlled tool.

18. An apparatus comprising:

a dielectric coating applied to a portion of a surface of a composite component and covering a metal feature exposed in the surface of the composite component, the dielectric coating being created on the portion of the surface of the composite component during the applying of the dielectric coating;

a metal adhesion promoter layer in a pattern on the dielectric coating and on an additional portion of the surface of the composite component, including on a grounding feature; and a conductive coating electrically connected to the grounding feature and covering the dielectric coating in an area encompassing the metal feature covered by the dielectric coating, the conductive coating being created on the metal adhesion promoter layer during applying of the conductive coating on the metal adhesion promoter layer, the metal adhesion promoter layer promoting bonding of the conductive coating to the dielectric coating when the conductive coating is created on the metal adhesion promoter layer.

19. The apparatus of claim 18, wherein the composite component is a skin of an aircraft and the metal feature is a fastener connecting the skin to a substructure.

20. The apparatus of claim 18, wherein the conductive coating is formed from a material selected from one of aluminum, copper, stainless steel, titanium, and invar.

* * * * *